Patented Apr. 9, 1935

1,996,754

UNITED STATES PATENT OFFICE 1,996,754

IMPROVING THE COLOR OF CELLULOSE DERIVATIVES

Camille Dreyfus, New York, N. Y., and Leslie N. Lee, Cumberland, Md., assignors to Celanese Corporation of America, a corporation of Delaware No Drawing. Application September 26, 1928, Serial No. 308,577

18 Claims. (Cl. 260—101)

This invention relates to the improving of color of cellulosic materials so that the solutions of the same are substantially water white.

An object of our invention is to produce organic derivatives of cellulose that are substantially free of color and which produce solutions that are practically water white. Other objects of our invention will appear from the following detailed description.

Organic derivatives of cellulose as ordinarily made, although they are fairly white in color while in a solid state, produce solutions that have a brownish tint. We have found that if either the cellulose used as the starting material for making the organic derivatives of cellulose or the organic derivative of cellulose after it is made, is treated with a dilute solution of nitric acid, the color of both the organic derivative of cellulose and of the solutions of the same is greatly improved.

In accordance with our invention, we prepare organic derivatives of cellulose of improved color by treating either the cellulose used as the starting material or the organic derivative of cellulose after it is formed, or both, with a solution of nitric acid.

In accordance with our invetnion any organic derivative of cellulose may be prepared or treated. Examples of such organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The organic derivatives produced by our invention are substantially free of color and solutions of the same are water white. They are, therefore, eminently suited for making artificial silks, coating compositions, plastic compositions, films, laminated glass and for all other purposes where a light color is desirable.

In one form of our invention, the cellulose used as the starting material for making the organic derivatives of cellulose is first treated with a liquid containing nitric acid. The cellulosic material may be in the form of cotton, cotton linters, wood pulp and the like. When treating the cellulosic material prior to the formation of the organic derivatives, the use of aqueous solutions of nitric acid of 5 to 70% concentration produce satisfactory results. The liquid containing the nitric acid that is employed for the pretreatment of the cellulosic material may also contain lower aliphatic acids such as acetic acid, formic acid, propionic acid etc. These acids may be present in amounts varying from a mere trace to that required for the subsequent acidylation or esterification. Thus if acetic acid is employed with the nitric acid, 1 to 35% by weight of the acetic acid based on the weight of the cellulose may be employed. Cellulose when treated with the mixed nitric acid and aliphatic acid is rendered more active for the subsequent acidylation or esterification. Organic derivatives of cellulose when made from such pretreated cellulose have not only improved color but also greatly improved clarity.

We have found that if the cellulosic material is dried without the removal of the acid by washing, and then acidylated, cellulose esters may be formed of vastly increased clarities.

In another form of our invention the organic derivative of cellulose is treated with the nitric acid solution after it is formed and preferably after it has reached the state where it is ordinarily used for making articles of commerce. It may be treated with the nitric acid before drying or after drying and is preferably treated with nitric acid solutions in a finely ground state. When organic derivatives of cellulose are treated with nitric acid, we have found that the use of dilute aqueous solutions of nitric acid of 0.25 to 2% concentration produce very satisfactory results at room temperatures.

In order to further illustrate our invention the following specific examples are given without limiting the scope thereof.

Example I

This is an example of treating a cellulose acetate, after it has been formed, with nitric acid.

An acetone soluble cellulose acetate having an acetyl value of 54.5% in as finely a ground state as possible, is suspended for 3 hours at room temperature in an aqueous solution containing 0.5% of nitric acid. The cellulose acetate is then washed free from acid and is then dried. The color of the cellulose acetate is greatly improved as indicated by the fact that solutions of the same in acetone are substantially water white, whereas solutions of cellulose acetate that have not been treated by this process have a distinct brownish tint.

If desired, instead of treating the cellulose acetate in the form of a powder, yarns or fabrics made of the organic derivatives of cellulose may be subjected to treatment with the nitric acid after they have been formed.

Example II

This is an example of treating the cellulosic material itself prior to its conversion into organic derivatives of cellulose.

Cotton linters are treated for one hour with a 60% aqueous solution of nitric acid at room temperature. The cotton is then thoroughly washed to remove the acid and is then dried. When the so treated cotton linters are acetylated to form an acetone soluble cellulose acetate, the cellulose acetate thus produced forms solutions in acetone that are substantially water white and have a clarity of 17.5 in certain arbitrary units. A similar cellulose acetate produced from untreated cotton linters forms solutions in acetone that have a brownish tint and a clarity of only 10 in the same units.

Example III

The following is an example of a method of preparing cellulose acetate of extremely high clarity and of excellent color by the pretreatment of cellulosic material with nitric acid solution and then drying the same while the acid is present.

30 parts by weight of cotton linters are treated with a bath containing 15 parts by weight of nitric acid and 100 parts by weight of water for four hours. The cotton linters are then removed from the bath and without being washed are dried at elevated temperature. The pretreated cotton is then acetylated with 80 parts of acetic anhydride, 100 parts of acetic acid and 4 parts of sulfuric acid by weight. The cellulose acetate thus formed has a clarity of 27 as against a clarity of 10 for cellulose acetate formed from untreated cotton linters. The solution of the cellulose acetate in acetic acid after acetylation has a pale lemon color as against the brown color of such a solution made from untreated cotton, thus indicating a great improvement in color.

Example IV

The following is an example of a process wherein the cellulosic material is pretreated with a mixture of nitric acid and acetic acid.

30 parts of cotton linters are treated with a mixture of 15 parts of 70% nitric acid and 100 parts of glacial acetic acid for four hours. The cotton is then removed from the bath and without washing is dried at elevated temperatures. The cotton is then acetylated in the bath described in Example III, whereupon a cellulose acetate is produced of a clarity of 33 as against a clarity of 10 for cellulose acetate prepared from untreated cotton, which cellulose acetate has the light color of that produced by the method of Example III.

It is to be understood that the foregoing detailed description is given merely by way of illustration and that many variations may be made therein without departing from the spirit of this invention.

Having described our invention, what we claim and desire to secure by Letters Patent is:

1. In the production of organic substitution derivatives of cellulose of improved color, the step of treating material selected from the group consisting of cellulose and acetone-soluble organic esters of cellulose with a dilute solution containing nitric acid, as the sole mineral acid, in a quantity less than the weight of the said material, under such conditions that preclude nitration and hydrolysis of the respective material.

2. In the production of simple organic substitution derivatives of cellulose of improved color, the step of treating an acetone soluble organic ester of cellulose with a solution of nitric acid of 0.25 to 2.0% concentration, the nitric acid being the sole mineral acid and being present in a quantity less than the weight of the material treated, under such conditions that preclude hydrolysis.

3. In the production of simple organic substitution derivatives of cellulose of improved color, the step of treating cellulose with a dilute solution containing nitric acid, as the sole mineral acid, in a quantity less than the weight of the cellulose, at a stage of the process prior to the introduction of any organic substituent radicles into the cellulose molecule.

4. In the production of cellulose acetate of improved color, the step of treating cellulose with a dilute solution containing nitric acid, as the sole mineral acid, in a quantity less than the weight of the cellulose at a stage of the process prior to the introduction of any acetyl groups into the cellulose molecule.

5. In the production of cellulose acetate of improved color, the step of treating material selected from the group consisting of cellulose and acetone-soluble cellulose acetate with a dilute solution containing nitric acid, as the sole mineral acid, in a quantity less than the weight of the said material, under such conditions that preclude nitration and hydrolysis of the respective material.

6. In the production of organically substituted celluloses of improved color, the steps of treating material selected from the group consisting of cellulose and acetone-soluble organic esters of cellulose with a dilute solution containing, as the sole mineral acid, nitric acid in a quantity less than the weight of the said material, under such conditions that preclude nitration and hydrolysis of the respective material, and then evaporating off the nitric acid.

7. In the production of acetyl celluloses of improved color, the steps of treating material selected from the group consisting of cellulose and acetone soluble cellulose acetate with a dilute solution containing, as the sole mineral acid, nitric acid in a quantity less than the weight of the said material, under such conditions that preclude nitration and hydrolysis of the respective material and then evaporating off the nitric acid.

8. In the method of producing organic substitution derivatives of cellulose, the step of treating material selected from the group consisting of cellulose and acetone-soluble organic esters of cellulose with a liquid containing, as the sole mineral acid, a quantity of nitric acid of 5 to 70% concentration less than the weight of the said material, under such conditions that preclude nitration and hydrolysis of the respective material.

9. Method of improving the color of acetone-soluble cellulose acetate comprising treating the same with a dilute solution of nitric acid, as the sole mineral acid, under such conditions that preclude hydrolysis, the nitric acid being present in a quantity less than the weight of the cellulose acetate.

10. Method of improving the color of acetone soluble cellulose acetate comprising treating the same with a solution of nitric acid of 0.25 to 2.0% concentration under such conditions that preclude hydrolysis, the nitric acid being the sole mineral acid and being present in a quantity less than the weight of the cellulose acetate.

11. Method of producing cellulose acetate comprising treating cellulose with a liquid containing, as the sole mineral acid, a quantity of nitric acid less than the weight of the cellulose under such conditions that cause no introduction of ester groups into the cellulose, and then acetylating the treated cellulose.

12. The method of producing cellulose acetate comprising treating cellulose with a liquid containing, as the sole mineral acid, a quantity of nitric acid of 5 to 70% concentration less than the weight of the cellulose under such conditions that cause no introduction of ester groups into the cellulose, and then acetylating the treated cellulose.

13. Method of producing simple organic substitution derivatives of cellulose comprising treating cellulose with a liquid containing, as the sole mineral acid, a quantity of nitric acid less than the weight of the cellulose under such conditions that cause no introduction of ester groups into the cellulose and then esterifying the so-treated cellulose.

14. Method of producing organic substitution derivatives of cellulose comprising treating cellulose with a liquid containing nitric acid and an aliphatic acid, the nitric acid being the sole mineral acid, in a quantity less than the weight of the cellulose, while causing no substantial change in the degree of substitution of the cellulose and then esterifying the so-treated cellulose.

15. Method of producing cellulose acetate comprising treating cellulose with a liquid containing nitric acid and acetic acid, the nitric acid being the sole mineral acid present, in a quantity less than the weight of the cellulose, while causing no substantial change in the degree of substitution of the cellulose and then acetylating the treated cellulose.

16. Organically substituted celluloses which form substantially water-white solutions in organic solvents and which have been prepared by a process wherein material selected from the group consisting of cellulose and acetone-soluble organic esters of cellulose has been treated with a dilute solution containing, as the sole mineral acid, a quantity of nitric acid less than the weight of the said material, under such conditions which preclude nitration and hydrolysis of the respective material.

17. Acetyl celluloses which form substantially water-white solutions in organic solvents and which have been prepared by a process wherein material selected from the group consisting of cellulose and acetone-soluble cellulose acetate has been treated with a dilute solution containing, as the sole mineral acid, a quantity of nitric acid less than the weight of the said material under such conditions that preclude nitration and hydrolysis of the respective material.

18. Organic substitution derivatives of cellulose of high clarity, which form substantially water-white solutions in organic solvents and which have been prepared by treating cellulose, prior to the introduction of any organic substituent radicles into the cellulose molecule, with a dilute solution containing, as the sole mineral acid, a quantity of nitric acid less than the weight of the cellulose and subsequently esterifying the product.

CAMILLE DREYFUS.
LESLIE N. LEE.